B. G. NELSON & G. A. KELLOGG.
COLLAPSIBLE PAN.
APPLICATION FILED NOV. 16, 1912.
1,095,914.
Patented May 5, 1914.
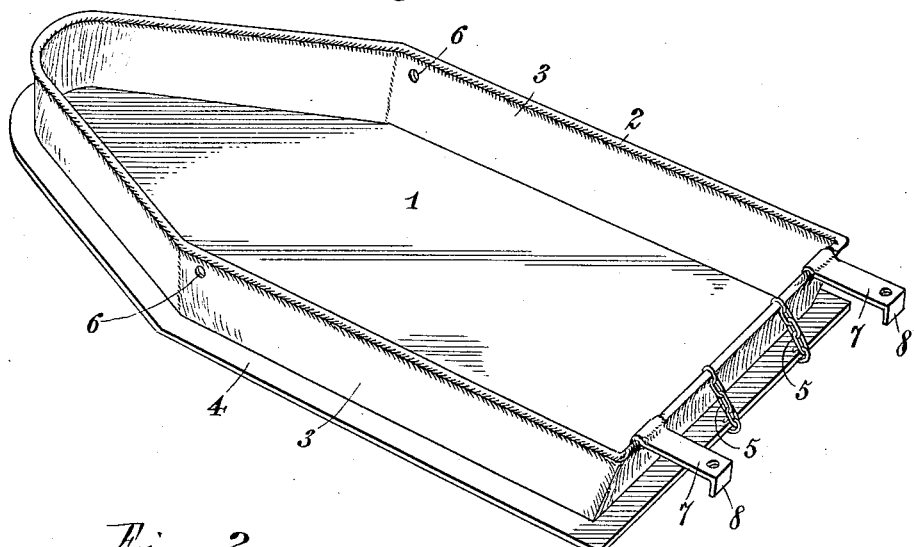
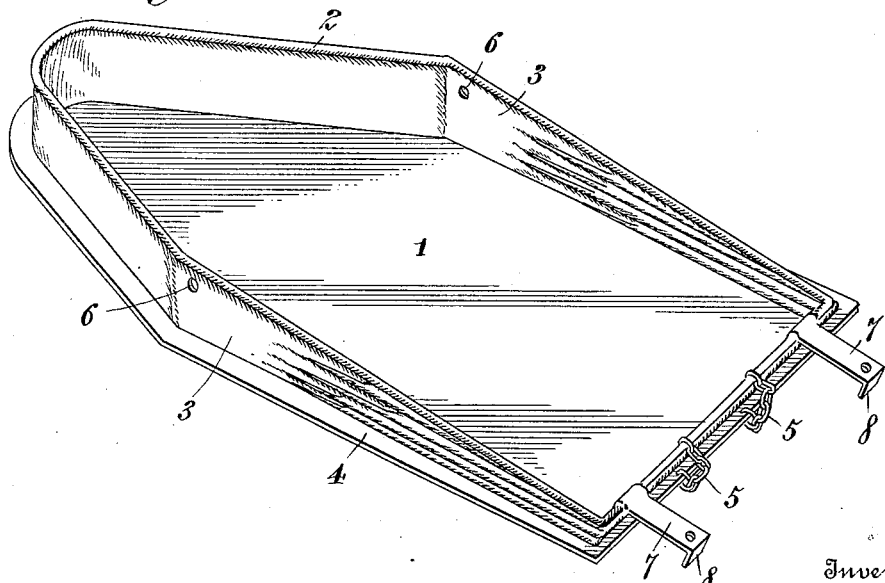
Witnesses:
Christ Feinle, Jr.
D. W. Gould.
Inventors,
Bruce G. Nelson and
George A. Kellogg.
By Victor J. Evans,
Attorney.

UNITED STATES PATENT OFFICE.

BRUCE G. NELSON AND GEORGE A. KELLOGG, OF LAKOTA, NORTH DAKOTA.

COLLAPSIBLE PAN.

1,095,914. Specification of Letters Patent. Patented May 5, 1914.

Application filed November 16, 1912. Serial No. 731,788.

*To all whom it may concern:*

Be it known that we, BRUCE G. NELSON and GEORGE A. KELLOGG, citizens of the United States, residing at Lakota, in the county of Nelson and State of North Dakota, have invented new and useful Improvements in Collapsible Pans, of which the following is a specification.

This invention relates generally to an auxiliary attachment for harvesting machinery, and particularly to a pan attached conveniently beneath the binder deck below the packers, or to the bundle carrier or beneath the elevators at the end of the table canvas, and serving to catch the grain, grass and weed seed that may become detached during the process of the harvesting.

The main object of the present invention is the provision of a pan of this type which is collapsible in that it will yield when passing over obstructions to avoid breakage without interfering with the receiving capacity of the pan.

The invention in its preferred form of details will be described in the following specification, reference being had to the accompanying drawings, in which:—

Figure 1 is a perspective view of the improved collapsible pan. Fig. 2 is a similar view showing the forward end thereof in collapsed condition.

Referring particularly to the accompanying drawings, the improved pan includes a bottom 1 of metal of substantial grade which is preferably, though not necessarily, shaped to present a square forward edge, parallel sides and a rear edge of rounded or angularly related sides. The upper edge of the pan comprises a rod-like element 2 shaped in outline to conform to the outline of the bottom, though having somewhat less transverse and longitudinal dimensions than the similar dimensions of the bottom. The sides 3 of the pan connect the upper rod-like edge and the bottom, these sides extending vertically from the upper edge 2 to the bottom by which arrangement, owing to the relatively larger size of the bottom than the upper edge, the bottom forms beyond the sides a guard flange 4 which serves to protect the sides of the pan from injury by the stubble or other obstructions with which it might otherwise contact.

The sides 3 are preferably formed of a flexible material, such as canvas, cloth or even light weight metal which will collapse under pressure and assume its normal position upon the relief of the pressure. The upper edge 2 at the front of the pan is connected with the projecting flange 4 of the pan at the forward edge by the chains or other flexible connectors 5, designed to aid in supporting the flexible sides and ends of the pan when an obstruction is met with.

The upper edge 2 of the pan is formed adjacent the rear end or at other appropriate points with openings 6 and the upper edge 2 at the forward end of the pan is provided with plate projections 7 having downturned lips 8 at their free ends, said projections and openings serving as a means for securing the pan in place on the harvester, it being understood in this connection that we contemplate the use of any appropriate fastening means for supporting the pan in position, the sole requirement in this connection being that the rigid attachment of the pan to the harvester must be through the upper edge only as the lower edge must be free for the collapsible operation.

In use, it will be obvious that with the pan properly positioned it will serve the purpose of receiving and retaining the grain, grass and weed seed that may become detached during the process of harvesting, and that in the event the forward end of the pan should meet an obstruction during the operation of the harvester the bottom will readily yield in the upward direction incident to the flexible sides of the pan and thereby override said obstruction with little or no liability of injury to the pan or of dumping of its contents.

The salient feature of the present invention resides in the collapsible pan for the purpose described. While we show the construction admirably adapted to this end it is to be understood that we do not thereby limit ourselves to the specific details shown, but contemplate within the spirit of the present invention any variation or modification of any such details as may fall within the scope of the appended claims.

What is claimed is:—

1. A collapsible pan for harvesters including a metallic bottom, a rod-like member forming the upper edge, collapsible sides connecting the rod-like member and bottom, said sides being connected with the bottom within the marginal edge thereof to provide a guard flange beyond said sides, and flexible connectors joining the bottom and upper edge at the forward edge of the pan.

2. A collapsible pan for harvesters including a metallic bottom, a rod-like member forming the upper edge, collapsible sides connecting the rod-like member and bottom, said sides being connected with the bottom within the marginal edge thereof to provide a guard flange beyond said sides, flexible connectors joining the bottom and upper edge at the forward edge of the pan, and means carried by the pan to support the same with relation to the harvester.

In testimony whereof we affix our signatures in presence of two witnesses.

BRUCE G. NELSON.
GEO. A. KELLOGG.

Witnesses:
 CHARLOTTE G. RIEMER,
 K. G. NELSON.